United States Patent
Shumarayev

(10) Patent No.: US 7,526,023 B1
(45) Date of Patent: Apr. 28, 2009

(54) PROGRAMMABLE CROSS-TALK CANCELLATION IN PROGRAMMABLE LOGIC DEVICE

(75) Inventor: Sergey Y Shumarayev, San Leandro, CA (US)

(73) Assignee: Altera Corporation, San Jose, CA (US)

( * ) Notice: Subject to any disclaimer, the term of this patent is extended or adjusted under 35 U.S.C. 154(b) by 721 days.

(21) Appl. No.: 11/223,173

(22) Filed: Sep. 8, 2005

(51) Int. Cl.
*H03H 7/30* (2006.01)
*H03H 7/40* (2006.01)
*H03K 5/159* (2006.01)

(52) U.S. Cl. .................. 375/233; 375/359; 375/361; 375/362

(58) Field of Classification Search .................. 375/354, 375/359–361, 229–230, 232–233; 713/500–501, 713/503
See application file for complete search history.

(56) References Cited

U.S. PATENT DOCUMENTS

| | | | |
|---|---|---|---|
| 2002/0154248 A1* | 10/2002 | Wittig et al. ................. | 348/614 |
| 2003/0152173 A1* | 8/2003 | Strolle et al. ................. | 375/347 |
| 2005/0135471 A1* | 6/2005 | Tonietto et al. ............. | 375/233 |
| 2006/0146945 A1* | 7/2006 | Chow et al. ................. | 375/260 |

* cited by examiner

*Primary Examiner*—Shuwang Liu
*Assistant Examiner*—James M Perez
(74) *Attorney, Agent, or Firm*—Ropes & Gray LLP; Jeffrey H. Ingerman

(57) ABSTRACT

Circuitry is provided in a programmable logic device incorporating clock-data recovery circuitry on I/O channels to allow the use of otherwise unused noise-reduction circuits in the I/O channels, such as decision-feedback equalization (DFE) circuits, to cancel or minimize cross-talk with other channels or other sources of cross-talk. Selectable connections are provided to allow various potential sources of cross-talk to be programmably connected to the DFE circuits instead of unused CDR output taps. When a user finalizes a user logic design, the user can determine the sources of cross-talk and the unused taps relative to a particular channel, and programmably connect the sources to the DFE circuits corresponding to those unused taps. DFE coefficients may then be adjusted to cancel or at least minimize the cross-talk. Programmable time delays can be provided to adjust for clock differentials between the cross-talk source and the particular channel under consideration.

15 Claims, 2 Drawing Sheets

PROGRAMMABLE CROSS-TALK CANCELLATION IN PROGRAMMABLE LOGIC DEVICE

BACKGROUND OF THE INVENTION

This invention relates to a programmable logic device (PLD) in which cross-talk may be programmably cancelled. More particularly, this invention relates to the reuse of unused portions of a high-speed serial interface of a PLD to accomplish cross-talk cancellation.

It has become common for PLDs to incorporate high-speed serial interfaces to accommodate high-speed (i.e., greater than 1 Gbps) serial I/O standards—e.g., the XAUI (Extended Attachment Unit Interface) standard and other standards. Typically, PLDs having such interfaces have a large number of high-speed I/O channels, and cross-talk among those channels is a common difficulty to be overcome. For example, a common implementation for the aforementioned XAUI standard involves groups of four transceiver channels called "quads", and there are usually several quads provided. There are thus many channels, and many opportunities for cross-talk.

It would be desirable to be able to provide a PLD in which cross-talk can be controlled without introducing a lot of extra circuitry.

SUMMARY OF THE INVENTION

The present invention provides a programmable logic device in which cross-talk may be programmably eliminated or at least reduced by re-using unused portions of the high-speed serial interface. Specifically, in many high-speed serial protocols, no separate clock signal is transmitted, and the high-speed serial interface typically uses clock-data recovery (CDR) techniques to derive the signal clock from the signal itself. CDR circuitry may be built on a loop architecture, similar to a phase-locked loop or delay-locked loop. One characteristic of such loops is the provision of multiple output taps.

In known CDR circuitry, each output tap is input to a decision-feedback equalizer (DFE) circuit, which is used for noise rejection. However, in any given user logic design in a PLD, one or more taps of a CDR circuit may remain unused, and certain CDR circuits may remain completely unused. Therefore, in accordance with the present invention, the DFE circuitry associated with the unused taps is re-used for cross-talk cancellation.

Thus, in accordance with the present invention there is provided clock-data recovery circuitry for a programmable logic device, which clock-data recovery circuitry is associated with an interface channel of the programmable logic device and is subject to cross-talk from at least one other signal source on the programmable logic device. The clock-data recovery circuitry includes a loop circuit having an input and a plurality of output taps, and a respective decision-feedback equalizer circuit accepting a respective output signal from each of at least one of the output taps. Each of the respective decision-feedback equalizer circuits has a programmable coefficient, and output of each respective decision-feedback equalizer circuit is fed back to the input of the loop circuit. A programmable selector between at least one of the output taps and its respective decision-feedback equalizer circuit allows programmable selection between that output tap and the at least one other signal source.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

As described above, the present invention provides a programmable logic device in which cross-talk may be programmably eliminated or at least reduced by re-using unused DFE circuitry, associated with unused taps of CDR circuitry in the high-speed serial interface, for cross-talk cancellation or reduction.

Although every user logic design is different, once the design is fixed by the user, the sources and amounts of cross-talk become known at least to a degree. The present invention provides multiplexers at the inputs to the aforementioned DFE circuits to allow a user to programmably select either a CDR tap or a cross-talk source as the input to each DFE circuit. For any unused CDR tap in a channel that is subject to cross-talk, the user can select the corresponding DFE circuit to receive as its input a known source of cross-talk. The noise-rejection function of that DFE circuit is then used to generate a signal to cancel or at least reduce the cross-talk.

The DFE circuitry includes a programmable coefficient, with values preferably between 0 and 1. The value of the coefficient needed to cancel or reduce a particular cross-talk source will differ for each source. In accordance with the invention, the coefficients preferably are programmable by the user, or by circuitry provided for that purpose, to cancel or reduce the cross-talk. If done by the user, the coefficients essentially are varied manually by trial and error until the cross-talk is preferably eliminated or at least minimized as much as possible. Instead of using manual trial and error, circuitry can be constructed to similarly try all combinations of coefficient values until the best result is achieved. Alternatively, circuitry can be constructed with a correlation function that can identify the best coefficient value.

When the DFE circuitry is used on the CDR tap outputs, the signals being processed by the DFE circuitry inherently share a clock with the channel of which the CDR circuitry is a part. However, when unused DFE circuits are used to cancel or reduce cross-talk from a different channel or other source, it is unlikely that the cross-talk source will share a clock with the current channel. Therefore, a programmable time delay preferably also is provided. Again, the time delay can be adjusted by trial and error by the user or by circuitry. Because the user knows which cross-talk signals are being cancelled or reduced, the user can program the PLD so that most of the clock differential is compensated for prior to arrival of the cross-talk source signal at the DFE circuitry, and in such a case, the programmable time delay may be used only for fine tuning the clock differential adjustment. However, the programmable time delay also can be used to fully compensate for the clock differential.

The invention will now be described with reference to FIGS. 1 and 2.

Figure 1:
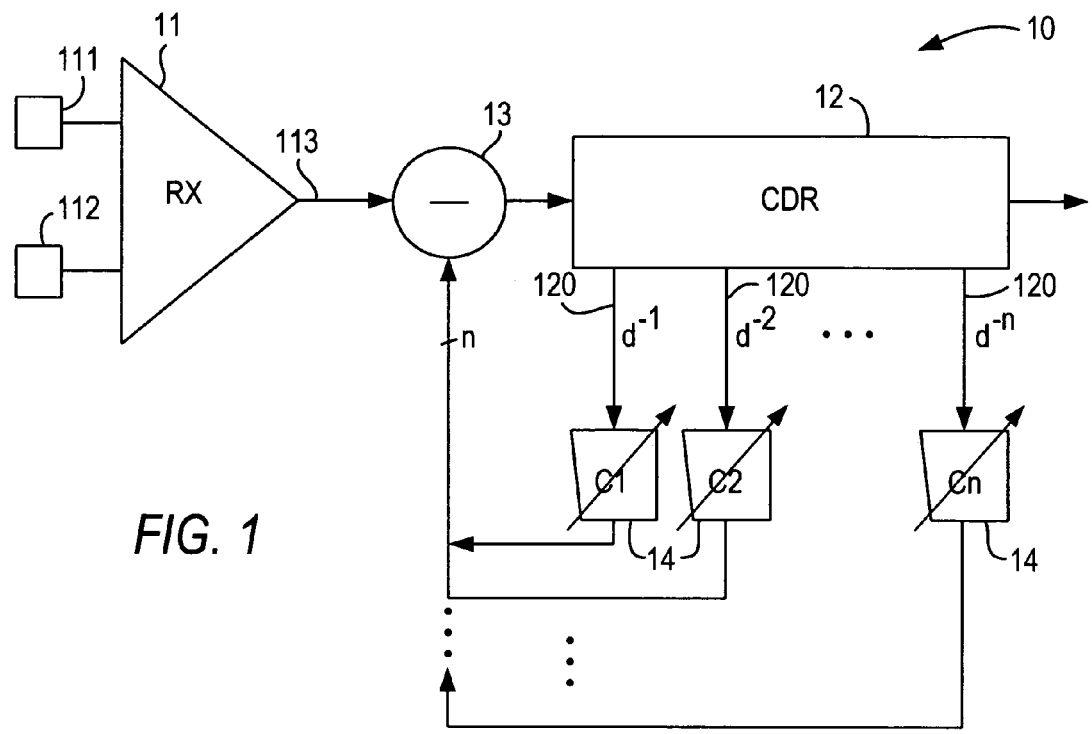
FIG. 1 is a schematic representation of the use of DFE circuitry in a CDR application.
Figure 2:
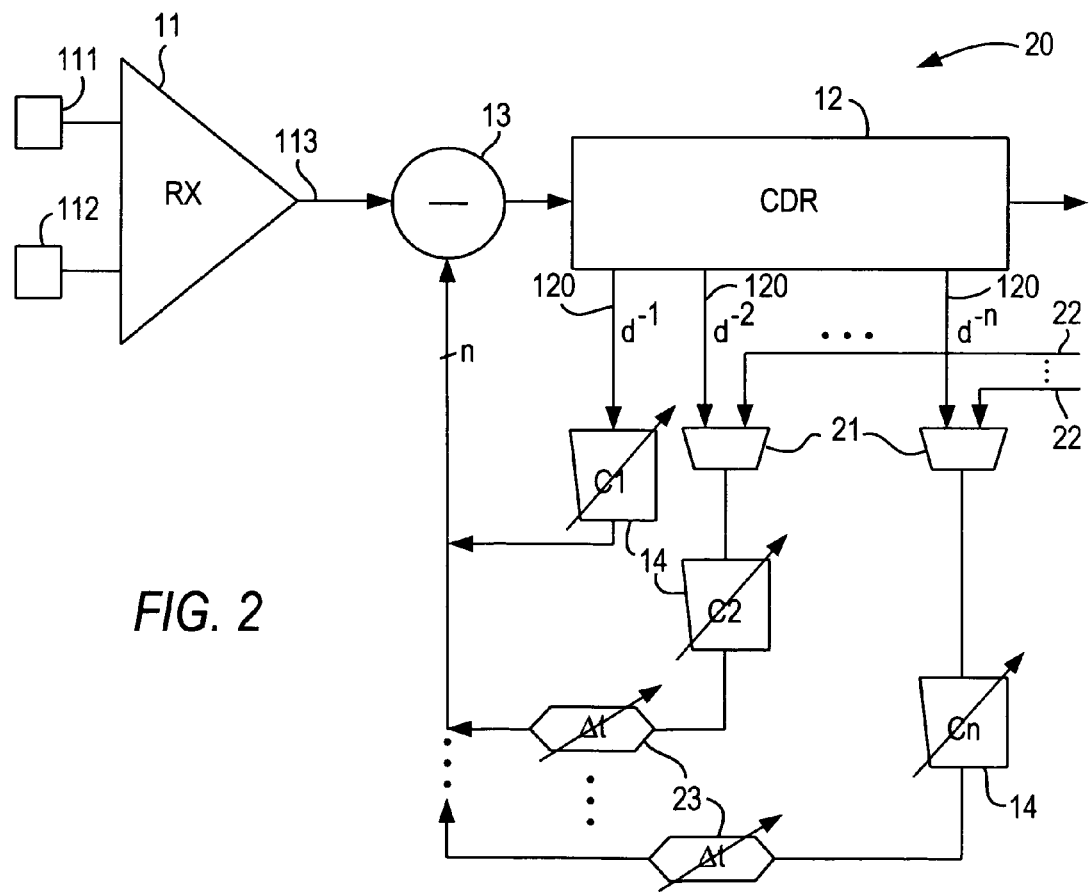
FIG. 2 is a schematic representation of CDR circuitry modified in accordance with the present invention.

FIG. 1 is a schematic representation of a receiver channel 10 including clock-data recovery circuitry. As shown, receiver 11 may have two inputs 111, 112 to accommodate a high-speed differential protocol (such as, e.g., LVDS), although the invention is applicable to single-ended protocols as well. The incoming signal, after initial processing in receiver 11, passes to CDR circuitry 12 through subtracter 13. The subtrahend signal for subtracter 13 is the received signal 113, while the minuend signal is a multibit output signal of n taps 120 of CDR circuitry 12 after processing of the tap outputs by respective ones of n DFE circuits 14. As seen, each of the n DFE circuits 14 includes an adjustable or programmable coefficient $C_n$. If d is the current data input to CDR circuitry 12, then each of n taps 120 represents one of the (d−1)st through (d−n)th data inputs. Each DFE circuit 14 thereby removes a portion, scaled by the respective coefficient $C_n$, of the interference contributed to the current data by the nth previous data.

In the known configuration of FIG. 1, the DFE circuitry is used to filter a wide distribution of noise or interference. In accordance with the present invention, as shown in FIG. 2, unused DFE circuits preferably can be used to attenuate or eliminate the deterministic interference contributed by a particular source or sources.

In each receiver channel 20 according to the invention, there preferably is interposed between a respective (d−n)th tap 120 and its associated DFE circuit 14 a selector, such as a multiplexer 21, that allows, as an alternative input into that respective DFE circuit 14, the output of a signal source 22 from outside channel 20. As shown in FIG. 2, no such selector is provided on the (d−1)st tap 120, because the computational resources necessary to generate a noise cancellation signal likely cannot operate quickly enough to cancel a noise component contributed only one bit period ago. However, in the event that sufficiently fast computational resources are available, it would not be outside the scope of the present invention to include a selector 21 on the (d−1)st tap 120. Optionally, and preferably, a variable time delay 23 is provided at the output of each respective DFE circuit 14 that has a selector 21 at its input, as discussed above and in more detail below.

Although channel 20 preferably is provided as a part of a general-purpose programmable logic device, for any particular user logic design, the user will know, or quickly determine, (a) which taps 120 are not being used, and (b) the characteristics of cross-talk sources 22. The user will therefore be able to select particular DFE circuits 14 to use for cross-talk reduction or cancellation, and to make the necessary adjustments to the coefficients $C_n$ to effectively cancel, or reduce as much as possible, the cross-talk contributed by a particular source 22. The number of cross-talk sources and available unused DFE circuits 14 will differ for every channel 20. Preferably, the number of available DFE circuits 14 will not be less than the number of cross-talk sources, so that all cross-talk sources can be compensated for. It will be appreciated that the method described herein for using one DFE circuit 14 to reduce or eliminate cross-talk from one source 22 is duplicated for each source 22 that affects a particular channel, assuming that sufficient unused DFE circuits 14 are available. If sufficient unused DFE circuits 14 are not available, the user may have to decide which cross-talk source(s) 22 can be left uncompensated for with the least detrimental effect on channel 20.

In one embodiment, the user can provide, as part of the user logic design, the capability to adjust coefficients $C_n$ manually. In a such an embodiment, the user can adjust the coefficients by trial and error, preferably aided by knowledge of the sources 22 to choose a starting setting close to the final setting, until the cross-talk is eliminated or at least minimized as much as possible. A similar result can be achieved by not providing an adjustment facility in the user logic design, but by simply reprogramming the programmable logic device with different coefficients until the desired result is achieved. This latter embodiment is somewhat less efficient in terms of the user's time, but may be more efficient because the adjustment facility will not have to be designed in creating the user logic design. Moreover, the "user" may not be the end user of the programmed programmable logic device, but rather the manufacturer of a product incorporating the programmable logic device who may not want to allow or require the end user to make the adjustments.

In another embodiment, circuitry can be provided as part of the user logic design to adjust the coefficients $C_n$ automatically. One such embodiment can simply try all combinations until a best result is achieved. Alternatively, it may be possible to devise a circuit with a correlation function that can compute or otherwise determine the necessary coefficients based on the cross-talk inputs 22.

As described above, variable time delays 23 preferably are provided to compensate for the fact that a particular cross-talk source 22, which may be another I/O channel of the programmable logic device or may be a completely different type of circuit on the programmable logic device, is likely to have a clock that is completely different from that of channel 20. As also described above, each variable time delay 23 can be used for fine tuning the clock adjustment, with the primary (i.e., coarse) adjustment being made (not shown) on the input 22, based on the user's knowledge of the clocks of both channel 20 the various sources 22, or delay 23 can be used for the entire clock adjustment. Either way, the adjustments can be made manually as described above in connection with adjustment of coefficients $C_n$, or by circuitry created by the user to make the adjustments, again as described above in connection with adjustment of coefficients $C_n$.

Thus it is seen that circuitry in which cross-talk may be programmably eliminated, or at least reduced, by re-using unused portions of the high-speed serial interface has been provided.

Figure 3:
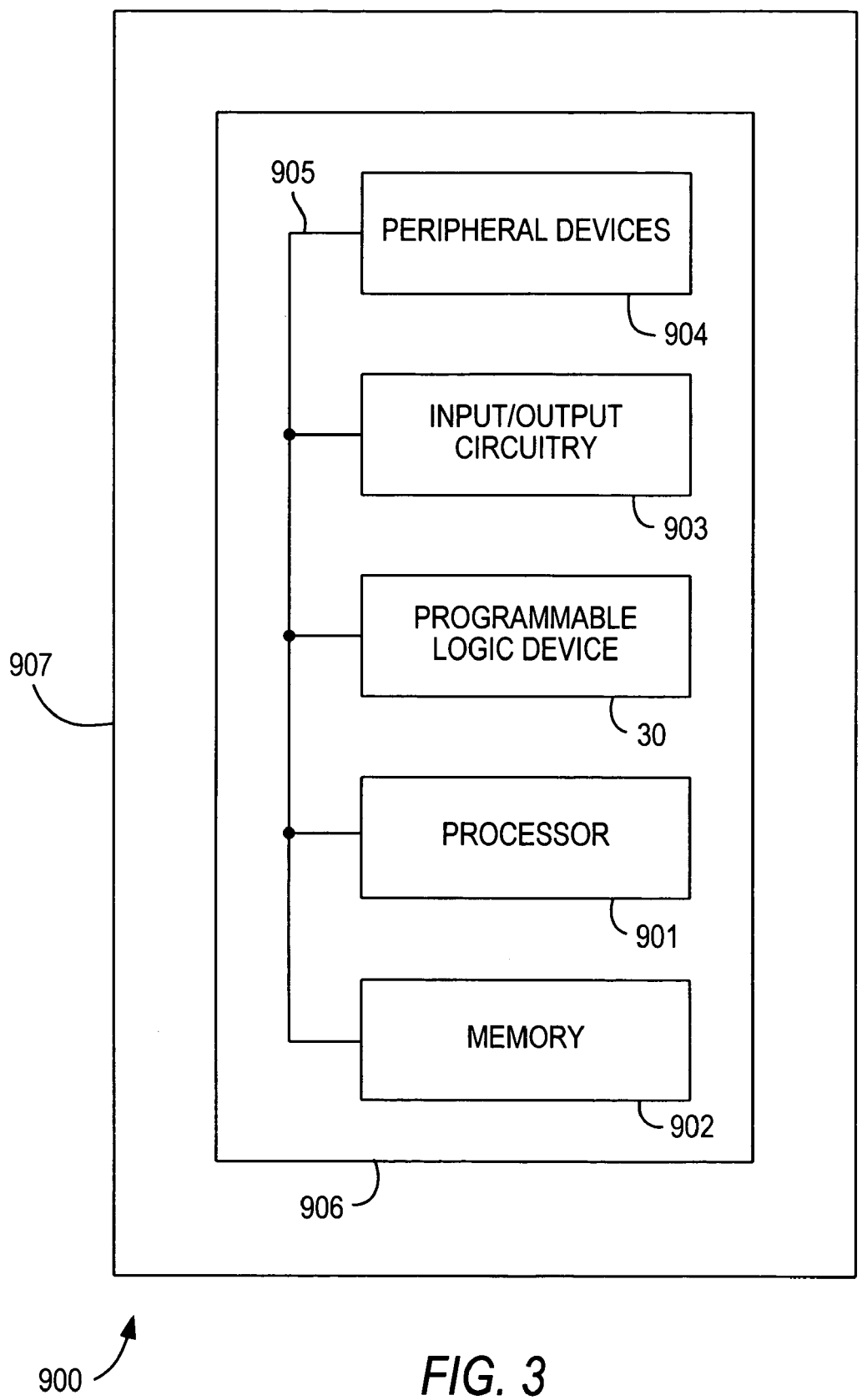
FIG. 3 is a simplified block diagram of an illustrative system employing a programmable logic device incorporating with the present invention.

A PLD 30 incorporating such circuitry according to the present invention may be used in many kinds of electronic devices. One possible use is in a data processing system 900 shown in FIG. 3. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 30 can be used to perform a variety of different logic functions. For example, PLD 30 can be configured as a processor or controller that works in cooperation with processor 901. PLD 30 may also be used as an arbiter for arbitrating access to a shared resources in system 900. In yet another example, PLD 30 can be configured as an interface between processor 901 and one of the other components in system 900. It should be noted that system 900 is only exemplary, and that the true scope and spirit of the invention should be indicated by the following claims.

Various technologies can be used to implement PLDs 30 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. Clock-data recovery circuitry for a programmable logic device, said clock-data recovery circuitry being associated with an interface channel of said programmable logic device and being subject to cross-talk from at least one signal source on said programmable logic device separate from said interface channel, said clock-data recovery circuitry comprising:
   a loop circuit having an input and a plurality of output taps, wherein (a) signals on both said input and said output taps are derived from said interface channel, and (b) the loop circuit at a given time uses fewer than said plurality of output taps;
   a respective decision-feedback equalizer circuit accepting a respective output signal from each of at least one of said output taps, each said respective decision-feedback equalizer circuit having a programmable coefficient, and output of each said decision-feedback equalizer circuit being fed back to said input of said loop circuit;
   at least one respective programmable selector between at least one respective one of said output taps and one said respective decision-feedback equalizer circuit, for programmably selecting between said output tap and said at least one signal source separate from said interface channel; wherein:
   when said at least one respective one of said output taps is unused, said at least one signal source separate from said interface channel is programmably selected and applied to said respective decision-feedback equalizer circuit; and
   said programmable coefficient is adjusted to minimize cross-talk from said one of said at least one signal source separate from said interface channel.

2. The clock-data recovery circuitry of claim 1 further comprising a programmable delay between said decision-feedback equalizer circuit and said input of said loop circuit.

3. The clock-data recovery circuitry of claim 1 wherein said selector comprises a multiplexer.

4. The clock-data recovery circuitry of claim 1 comprising:
   a first set of decision-feedback equalizer circuits, said first set comprising at least one said decision-feedback equalizer circuit associated with a first said output tap;
   a second set of decision feedback equalizer circuits comprising a plurality of said decision-feedback equalizer circuits, wherein each said decision-feedback equalizer circuit in said second set is associated with one of said output taps other than said first output tap; and
   one said selector for each said decision-feedback equalizer circuit in said second set; whereby:
   a plurality of said decision-feedback equalizer circuits are used for simultaneously cancelling cross-talk from a plurality of said at least one signal source separate from said interface channel.

5. A programmable logic device comprising the clock-data recovery circuitry of claim 1.

6. A digital processing system comprising:
   processing circuitry;
   a memory coupled to said processing circuitry; and
   a programmable logic device as defined in claim 5 coupled to the processing circuitry and the memory.

7. A printed circuit board on which is mounted a programmable logic device as defined in claim 5.

8. The printed circuit board defined in claim 7 further comprising:
   memory circuitry mounted on the printed circuit board and coupled to the programmable logic device.

9. The printed circuit board defined in claim 8 further comprising:
   processing circuitry mounted on the printed circuit board and coupled to the memory circuitry.

10. An integrated circuit device comprising the clock-data recovery circuitry of claim 1.

11. A digital processing system comprising:
    processing circuitry;
    a memory coupled to said processing circuitry; and
    an integrated circuit device as defined in claim 10 coupled to the processing circuitry and the memory.

12. A printed circuit board on which is mounted an integrated circuit device as defined in claim 11.

13. The printed circuit board defined in claim 12 further comprising:
    memory circuitry mounted on the printed circuit board and coupled to the programmable logic device.

14. The printed circuit board defined in claim 13 further comprising:
    processing circuitry mounted on the printed circuit board and coupled to the memory circuitry.

15. A method of cancelling cross-talk between an interface channel of a programmable logic device and at least one signal source on said programmable logic device separate from said interface channel, said programmable logic device comprising clock-data recovery circuitry, said method comprising:
    receiving a signal derived from said interface channel at an input to a loop circuit, the loop circuit having a plurality of output taps, wherein the loop circuit at any given time uses fewer than said plurality of output taps;
    receiving a respective output signal from each of at least one of said output taps at a respective decision-feedback equalizer circuit, each said respective decision-feedback equalizer circuit having a programmable coefficient, and output of each said decision-feedback equalizer circuit being fed back to the input of said loop circuit;
    when said at least one respective one of said output taps is unused, programmably selecting and applying, with at least one programmable selector, one of said at least one signal source separate from said interface channel to said respective decision-feedback equalizer circuit; and
    programmably adjusting a coefficient of said respective decision-feedback equalizer circuit to minimize cross-talk from said one of said at least one signal source separate from said interface channel.

* * * * *